(12) United States Patent
Thurfjell et al.

(10) Patent No.: US 8,295,370 B2
(45) Date of Patent: Oct. 23, 2012

(54) METHOD AND ARRANGEMENT FOR IMPROVED LINK QUALITY CONTROL

(75) Inventors: Magnus Thurfjell, Luleå (SE); Tomas Jönsson, Luleå (SE); Magnus Olsson, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 995 days.

(21) Appl. No.: 12/279,020

(22) PCT Filed: Jun. 13, 2006

(86) PCT No.: PCT/SE2006/050194
§ 371 (c)(1),
(2), (4) Date: Dec. 1, 2008

(87) PCT Pub. No.: WO2007/091936
PCT Pub. Date: Aug. 16, 2007

(65) Prior Publication Data
US 2009/0154574 A1 Jun. 18, 2009

Related U.S. Application Data

(60) Provisional application No. 60/771,896, filed on Feb. 10, 2006.

(30) Foreign Application Priority Data

Jun. 13, 2006 (WO) .................. PCT/SE2006/050194

(51) Int. Cl.
*H04L 27/00* (2006.01)

(52) U.S. Cl. ........ 375/259; 375/295; 375/316; 370/329; 370/330; 455/69; 455/450

(58) Field of Classification Search ................ 375/259, 375/295, 316; 370/329, 330; 455/69, 450, 455/552
See application file for complete search history.

(56) References Cited

U.S. PATENT DOCUMENTS

| | | | |
|---|---|---|---|
| 5,822,315 A | 10/1998 | De Seze et al. | |
| 2004/0253927 A1* | 12/2004 | Qiu | 455/67.13 |
| 2005/0053038 A1 | 3/2005 | Kimura | |
| 2005/0118959 A1* | 6/2005 | Johan et al. | 455/67.11 |
| 2005/0159166 A1 | 7/2005 | Jonsson et al. | |
| 2006/0089102 A1 | 4/2006 | Nishio et al. | |
| 2006/0223468 A1* | 10/2006 | Toms et al. | 455/190.1 |

* cited by examiner

*Primary Examiner* — Zewdu Kassa
(74) *Attorney, Agent, or Firm* — Roger S. Burleigh

(57) ABSTRACT

In a method of link quality control for communication links between a plurality of mobile terminals and a node in a radio communication system, providing (S0) at least one data block for transmission between said node and at least one of said mobile terminals, providing (S1) at least two measurement reports comprising measurements of the quality for a plurality of potential burst constellations on which to transmit said at least one data block, jointly selecting (S2) a respective burst constellation for each said at least one data block based at least on said measurement reports, jointly selecting (S3) a respective modulation and coding scheme for each said data block based at least on said measurement reports. Subsequently, scheduling (S4) bursts for transmission on at least one available channel based at least on said jointly selected modulation and coding scheme and said jointly selected burst constellation.

22 Claims, 8 Drawing Sheets

METHOD AND ARRANGEMENT FOR IMPROVED LINK QUALITY CONTROL

This application claims the benefit of U.S. Provisional Application No. 60/771,896, filed Feb. 10, 2006, the disclosure of which is fully incorporated herein by reference.

TECHNICAL FIELD

The present invention generally concerns packet based data transmissions in wireless telecommunication systems, and in particular improved link quality control for such transmissions.

BACKGROUND

Radio communication systems of today typically employ a modulation and coding scheme in which a data-carrying signal is superimposed on or mixed into a propagating carrier signal.

For some communication systems, including a GSM (Global System for Mobile Communication) or GPRS (General Packet Radio Service) system, the sole choice of available modulation and coding scheme has been GMSK (Gaussian Minimum Shift Keying). GMSK is a kind of constant-envelope phase modulation, where transmitting a zero bit or a one bit is represented by a change in the phase of the signal. Thus, every transmitted symbol represents one bit.

Introduction of the EDGE (Enhanced Data rates for GSM Evolution) technology into a GPRS system provides another modulation and coding scheme to be employable for radio communications, namely 8-PSK (8-state Phase Shift Keying). 8-PSK enables reuse of the channel structure, channel width and the existing mechanisms and functionality of the GMSK-using GPRS system. However, 8-PSK enables higher bit rates per time slot than those available for GMSK. 8-PSK is a linear method that uses phase modulation, in which three consecutive bits are mapped onto one symbol. Although the symbol rate remains the same as for GMSK, each symbol now represents three bits instead of one, thus increasing the total data rate by a factor of three.

In addition to the above mentioned 8-PSK method, an even higher order modulation and coding scheme is being discussed, namely 16QAM. This, when introduced, will enable even more available MCS modes.

Present day Enhanced GPRS (E-GPRS) systems having access to both GMSK and 8-PSK modulation can use nine different modulation and coding schemes (MCS:s), MCS-1 to MCS-9. The lower four coding schemes (MCS-1-MCS-4) use GMSK whereas the upper five (MCS-5-MCS-9) use 8-PSK. These nine MCS:s use different error correction and consequently are adapted for usage under different environment conditions. Generally, in good radio environments, a more aggressive (less error correction, possibly also 8-PSK associated MCS) coding scheme can be used to provide a higher user data rate, whereas with a poor radio link environment a coding scheme with more error correction (possibly also GMSK-associated MCS) and lower user data rate is typically used.

The E-GPRS system also employs a link quality control (LQC) functionality, usually denoted link adaptation. Link adaptation uses radio link quality measurements from a mobile terminal to select the most appropriate modulation and coding scheme for transmission of subsequent data packets or data blocks to the mobile terminal. Such a measurement report from the mobile terminal typically includes only link quality measurements e.g. BEP (Bit Error Probability) for the modulation that has been used since a last measurement report.

In GSM/EDGE, RLC (Radio Link Control) blocks, comprising the actual payload or data blocks to be transmitted, are sent over two or four radio bursts depending on the coding scheme. For MCS-1-7, both the header and the RLC block(s) are interleaved over four bursts. (A radio block comprises four bursts or sub-blocks.) For MCS:s-8-9 the header is interleaved over all four bursts of a radio block, but the two RLC blocks are separated on two bursts each.

The different modulation and coding schemes also have different diversity properties. The MCS:s with robust coding (e.g. MCS-1 and MCS-5) benefit from as much diversity as possible (e.g. use of frequency hopping). Coding schemes with weaker coding on the other hand (e.g. MCS-4 and MCS-9) benefit from as little diversity as possible (e.g. by not using frequency hopping and try to get the bursts within a radio block as correlated as possible). [1], [2].

Typically, the choice of MCS is based on information from the previously mentioned measurement reports. These reports usually contain estimates on the distribution (mean and standard deviation) of burst bit error (BER) over a radio block, and are typically measured and reported by each mobile terminal to its associated base transceiver station or base station controller.

For the case of multiple time slots and especially with multi-carrier, there is a large number of possible ways to theoretically choose a set of bursts (burst constellation) on which to transmit an RLC block, based on the discussion above. Today, this set of bursts is fixed to one carrier, one timeslot and sequentially in time, which means the blocks are not necessarily transmitted in the most efficient manner.

If a radio block is pre-allocated on fixed allocation of bursts this also implies that the only way to optimize e.g. throughput is by attempting a correct MCS choice. Furthermore, other requirements like short transmission time intervals (TTI) are not possible to address dynamically at all.

In general, for channel coding frequency hopping has a positive effect on the decoding capability due to interference and frequency diversity. However, if the data to be transmitted has a high coding rate or even is virtually uncoded (which is the case for MCS-4 and MCS-9 in GSM/EDGE), the chance of correctly received data relies on good link quality throughout a complete block or frame. Frequency hopping implies that bad quality is distributed between blocks or frames and is hence not desirable for these coding schemes.

Consequently, there is a need for improved link adaptation and associated selection of optimal modulation and coding schemes.

SUMMARY

A general object of the present invention is to provide improved link adaptation.

According to a general aspect, the invention enables a method of combined link quality control wherein the modulation and coding scheme and burst constellation is jointly selected for a group of radio link control blocks awaiting transmission.

According to a specific aspect, the present invention comprises a method of link quality control for communication links between a plurality of mobile terminals and a node in a radio communication system. This is provided by providing data blocks for transmission between the node and at least one of the mobile terminals, providing multiple measurement reports comprising measurements of the quality for different potential burst constellations on which to transmit the data block. Subsequently, the method includes jointly selecting a respective burst constellation for each data block based at least on the measurement reports, and jointly selecting a respective modulation and coding scheme for each data block based at least on the measurement reports. Finally, each data block is scheduled on bursts for transmission on the jointly selected burst constellation and with the jointly selected modulation and coding scheme.

According to another specific aspect, the present invention comprises a system for link quality control of communication links between a plurality of mobile terminals and a node in a radio communication system. The system comprises a unit for providing data blocks for transmission between said node and at least one of said plurality of mobile terminals, a unit for providing at least two measurement reports concerning the quality of potential burst constellations on which to schedule the data blocks for transmission. Further, the arrangement comprises a unit for jointly selecting a respective burst constellation for the data blocks based at least on the provided measurement reports, and a unit for jointly selecting a respective modulation and coding scheme for the data blocks based at least on the measurement reports. Finally, the arrangement comprises a unit for scheduling the data blocks on bursts for transmission on at least one available channel alternative based at least on the jointly selected modulation and coding scheme and the jointly selected burst constellation.

Advantages of the present invention comprise:
Efficient choice of modulation and coding schemes and burst constellation(s)
Increased throughput and lower delays
Flexible choice of TTI-length, which can be combined with the QoS profile and be used as a parameter when the constellation and modulation and coding scheme is chosen

BRIEF DESCRIPTION OF THE DRAWINGS

The invention, together with further objects and advantages thereof, may best be understood with reference to the following description taken together with the accompanying drawings, in which.

ABBREVIATIONS

Figure 1:
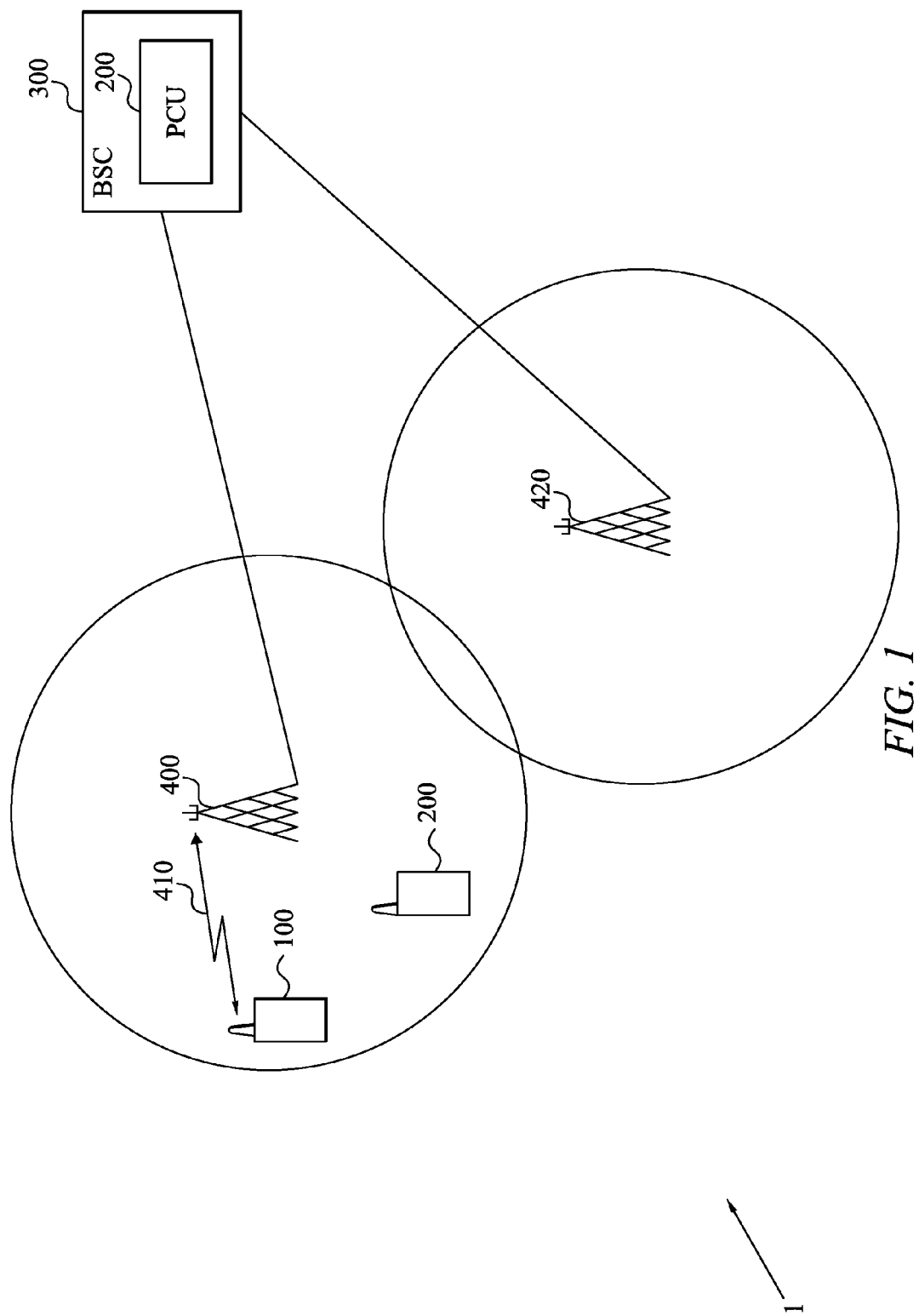
FIG. 1 is an illustration of part of a radio communication system in which the invention can be utilized.

BEP Bit Error Probability
EDGE Enhanced Data Rates for GSM Evolution
GMSK Gaussian Minimum Shift Keying
GPRS General Packet Radio Service
GSM Global System for Mobile communication
LQC Link Quality Control
MCS Modulation and Coding Scheme
QoS Quality of Service
RLC Radio Link Control
TTI Transmission Time Interval
8-PSK 8-state Phase Shift Keying

DETAILED DESCRIPTION

Throughout the drawings, the same reference characters will be used for corresponding or similar elements.

In several radio communications systems of today different modulation and coding schemes or techniques are employed for modulating data, transmitted on radio communication links through the system. In cases of multiple available modulation and coding schemes, the selection of the actual modulation and coding scheme to use is then typically based on the radio quality of the communications link. The present invention relates to performing such modulation and coding scheme selection.

FIG. 1 is a schematic overview of a portion of a radio communication system 1, to which the teachings of the invention can be applied. In FIG. 1, only units directly involved in the present invention are illustrated in order to simplify the figure. The radio communication system 1 could be an EGPRS system, or some other related system.

Generally, the radio communication system 1 comprises a number of base stations (BS) or base transceiver stations (BTS) 400, 420 providing communication links to connected mobile units 100, 200. These base stations 400, 420 are typically connected to and controlled by a base station controller (BSC) 300 or radio network controller (RNC). The BSC 300 in turn includes functionality or units 200 for selecting modulation and coding schemes to use for the communication link 410 to the mobile unit(s) based on link quality measurements or estimations from the mobile units 100, 200 and/or the base stations 400, 420. In the figure, this modulation and coding scheme selecting unit is represented by, but not limited to, a packet control unit (PCU) 200.

During operation, each mobile unit 100, 200 typically perform signal or link quality measurements for the (downlink) communication link or channel 410 with its associated base station 400. Based on these measurements a link quality measure is determined or estimated.

In its most basic form, the present invention provides methods and arrangements for improved link quality control or link adaptation, by means of jointly selecting burst constellation and modulation and coding schemes for a group of data blocks, i.e. radio link control blocks, to be transmitted between a mobile terminal and a network node i.e. base transceiver station.

Figure 2:
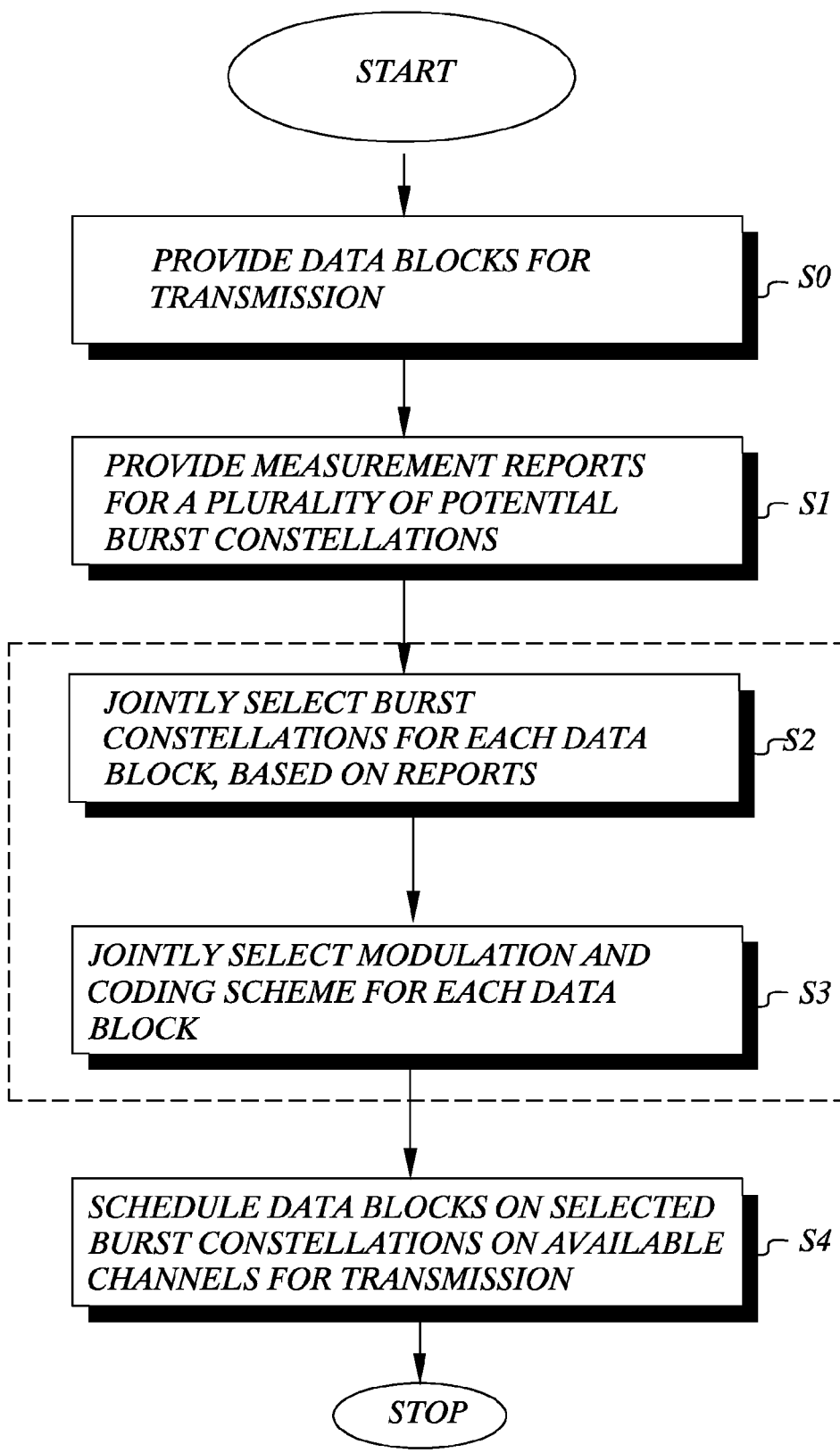
FIG. 2 is a schematic flow diagram of an embodiment of the invention.

Accordingly, in relation to an embodiment of the present invention as illustrated by FIG. 2, one or a plurality of data blocks such as radio link control blocks (RLC) are provided S0 for transmission between the node i.e. base transceiver station, and one or more of the mobile terminals. At least two measurement reports including measurements relating to the quality for potential burst constellations on which to transmit the RLC block are provided S1.

Subsequently, a respective burst constellation and a modulation and coding scheme is jointly selected S2, S3 for each of the plurality of RLC blocks based at least on the provided multiple measurement reports.

Finally, the data blocks are scheduled S4 for transmission on a channel based on the selected burst constellations and the selected modulation and coding schemes.

The method will be further described in the context of downlink communication; however, it should be remembered that the invention is equally applicable for uplink communication.

A specific embodiment according to the invention, also with reference to FIG. 2, comprises each of the plurality of mobile terminals 100, 200 collecting and providing S1 the above mentioned measurements for a plurality of burst constellations BC. These measurements are reported i.e. by means of the so called measurement report, to and provided at S1 a controlling node in the system, i.e. base transceiver station, base station controller or radio network controller.

Subsequently, burst constellations BC and modulation and coding schemes MCS are jointly selected S2, S3 for a set S of received RLC-blocks S0 to be transmitted for each mobile unit (at least one RLC block from each mobile unit). The dotted square in the figure further indicates the described joint selection. Finally, the RLC blocks are scheduled S4 for transmission according to the selected burst constellations BC and MCS on one or more available channels.

For the case of uplink communication, the measurements are collected and provided S1 by the node i.e. base transceiver station. Subsequently, the base transceiver station makes the decision S2, S3 for the mobile terminals which burst constellation and modulation and coding scheme that each mobile terminal should use for transmission to the base transceiver station, and each mobile terminal schedules S4 the data blocks for transmission according to the selected burst constellation and modulation and coding scheme.

The decision S2, S3 may, according to a specific embodiment, be provided at the mobile terminals by means of a set of instructions communicated from the base transceiver station to each mobile terminal.

A few different examples of potential burst constellations and their respective advantages and disadvantages will be described below.

According to an exemplary embodiment, (not shown) a potential burst constellation comprises two bursts sequentially on one frequency and the other two bursts sequentially on another frequency. Thus, each measurement report has to include measurements for this type of burst constellation, e.g. MEAN_BEP (mean block error probability) and CV_BEP (coefficient of variation for block error probability) for that burst configuration for each mobile user. The general idea of the invention is then to combine this information with a set of RLC blocks (at least one from each of a plurality of mobile users) that are ready to be scheduled for transmission. This information may also be combined with the respective users QoS requirements, especially if at least some of the users are able to utilize multiple services. The information is then used to distribute the set of RLC blocks over the available burst constellations.

Figure 3:
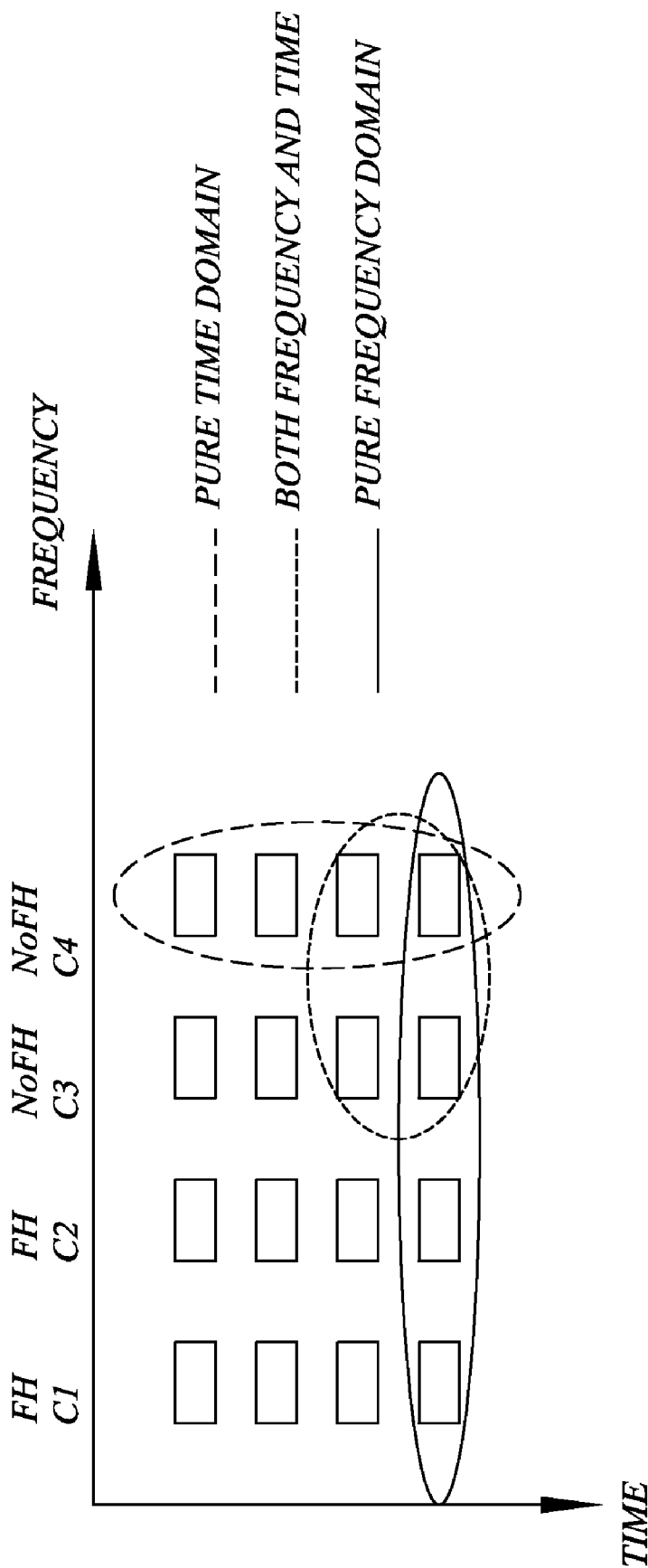
FIG. 3 is an illustration of some possible burst constellation examples according to the invention.

Another EGPRS embodiment, relating to the multi-carrier concept and with four simultaneous carriers in one time slot, includes the situation where the various possible burst constellations comprise three main types, as illustrated by FIG. 3. The different burst constellations can be described as follows:

Pure time domain: (vertical). This is the typical way of doing it corresponding to current standard; all four bursts for a data block are allocated on the same carrier frequency in sequence and in the same time slot. In this exemplary case, the carrier chosen is a non-hopping carrier and the quality difference between bursts is therefore relatively low, which is typically good for low robustness MCS:s, such as MCS-4 and MCS-9. The transmission time interval (TTI) will in this case be the common 20 ms.

Pure frequency domain: (horizontal). This is a way of using all four carriers in a way that creates a very fast TTI (only 5 ms). All four bursts are allocated in parallel on the four available carriers, i.e. parallel in time. The diversity properties will be very similar to a single frequency-hopping carrier. This is a good choice if an MCS with higher robustness is to be used, and a fast TTI is desired. For example, this is good for delay sensitive data, like PS conversational type services.

Combined frequency and time domain: (square). In this example the four bursts are allocated in pairs and sequentially on two carriers. This alternative is especially beneficial for coding schemes like MCS-9, which has two RLC blocks interleaved over two bursts each, both desiring low diversity. This choice provides low diversity for each of the two blocks since the two bursts per block are placed on non-hopping carriers. Furthermore, the header benefits from higher diversity since not all four bursts are sent on the same carriers. Furthermore, this constellation provides a choice of a 10 ms TTI.

Figure 4:
FIG. 4 is an illustration of a further embodiment of the invention.

According to another specific embodiment, with reference to FIG. 4, the choice of burst constellation and MCS is performed further based on QoS requirements for each mobile user/terminal and their respective RLC blocks. FIG. 4 illustrates the case where three RLC blocks with different QoS requirements arrive, as indicated by the three arrows at the left side of the figure, at an arrangement for multi-block LQC according to the invention. At the same approximate time the measurement report from each mobile terminal for each potential burst constellation arrive at the arrangement, as indicated by the top arrow. The arrangement is consequently adapted to select, jointly for the three RLC blocks, the burst constellation and the MCS based on one of or a combination of:

QoS requirements, e.g. delay sensitivity. This can optionally indicate a preferred TTI-length.
Diversity properties. Depending on which MCS is selected the necessary diversity properties enabling highest performance may vary.

Based on the above discussed parameters, the best or optimal MCS and burst constellations are chosen for each RLC block by the arrangement according to the invention.

Figure 5:
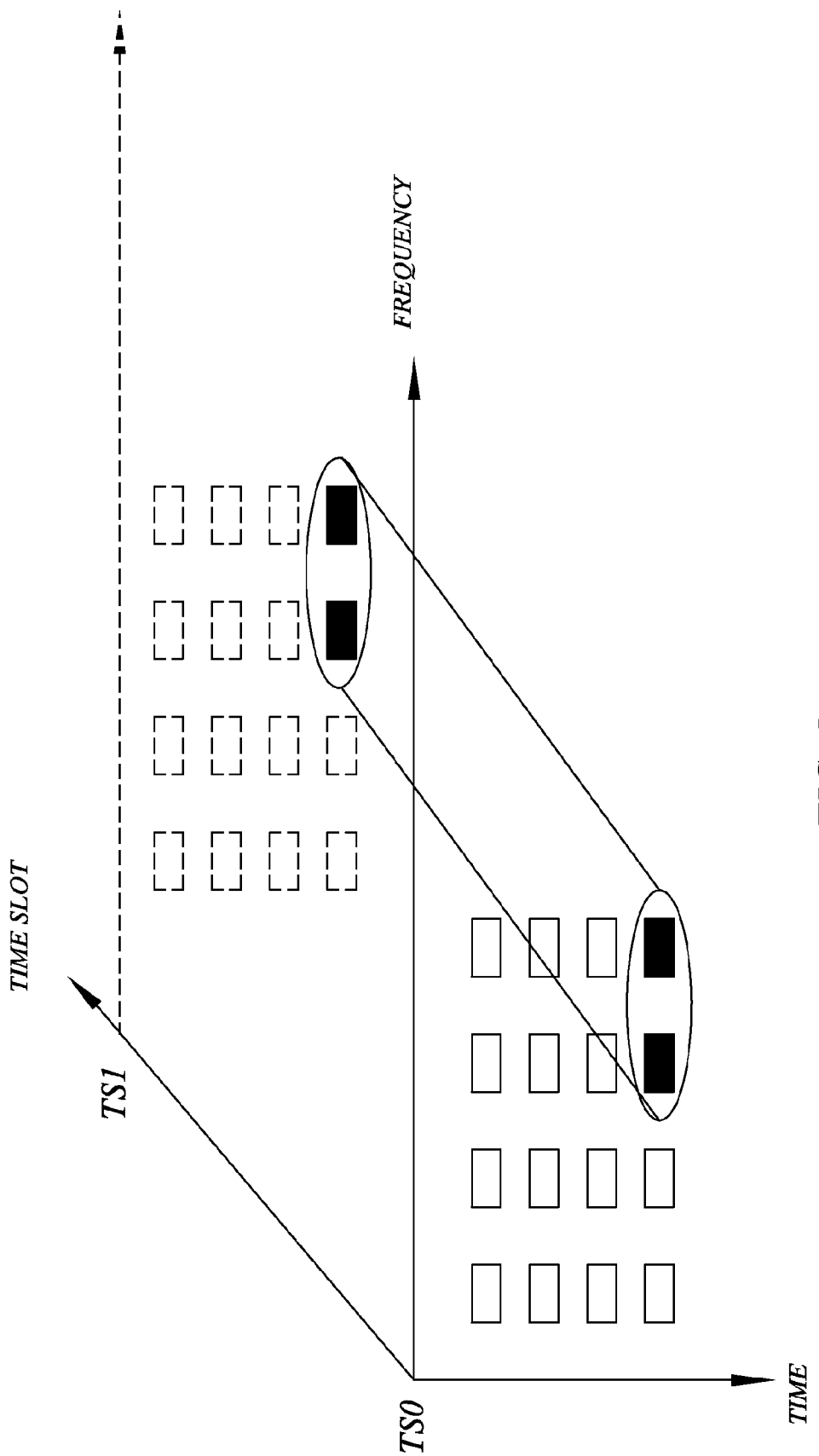
FIG. 5 is an illustration of another embodiment of the invention.

A further specific embodiment is illustrated by FIG. 5. For this case, the selection of burst constellations is given a further degree of freedom by allocating bursts in different timeslots as well. Accordingly, as illustrated by but not limited to FIG. 5, the four bursts are allocated in pairs on two carrier frequencies, in this example non-hopping, and in two consecutive time slots. Thereby, another desirable combination of TTI-length and diversity properties is enabled.

According to another specific embodiment, in order to reduce the number of constellations to search through, the number of possible burst constellations is limited to a predetermined set of constellations. These potential burst constellations are preset to provide a sufficient set of different combinations of TTI-length and diversity options. Consequently, the mobile only needs to search the predetermined set of burst constellations to find the header.

As an example of a possible embodiment in relation to a GSM/EDGE-system, the MCS selection could be based on the measured link quality and the blocks could be scheduled for transmission on hopping or non-hopping channels depending on the selected MCS.

Further, the frequencies allocated to a multi-carrier could be divided into two or more groups with varying number of frequencies in the hopping sequence. In the simplest case there would be two groups, one with frequency hopping and one non-hopping group. The MCS is selected based on a link quality control scheme. For the example of GSM/EDGE the selection is made from MCS-1-MCS-9. MCS-4 and MCS-9 are the two uncoded schemes and are therefore preferably sent on a low diversity group e.g. non-hopping channel(s). Accordingly, it is optionally possible to perform a step of prioritizing the blocks based on selected MCS, and QoS profile for the block.

According to the embodiment, the scheduling procedure is dependent on the MCS selection, such that coding schemes that benefit from hopping channels should get a higher scheduling priority on the frequency group with hopping channels, and vice versa.

Figure 6:
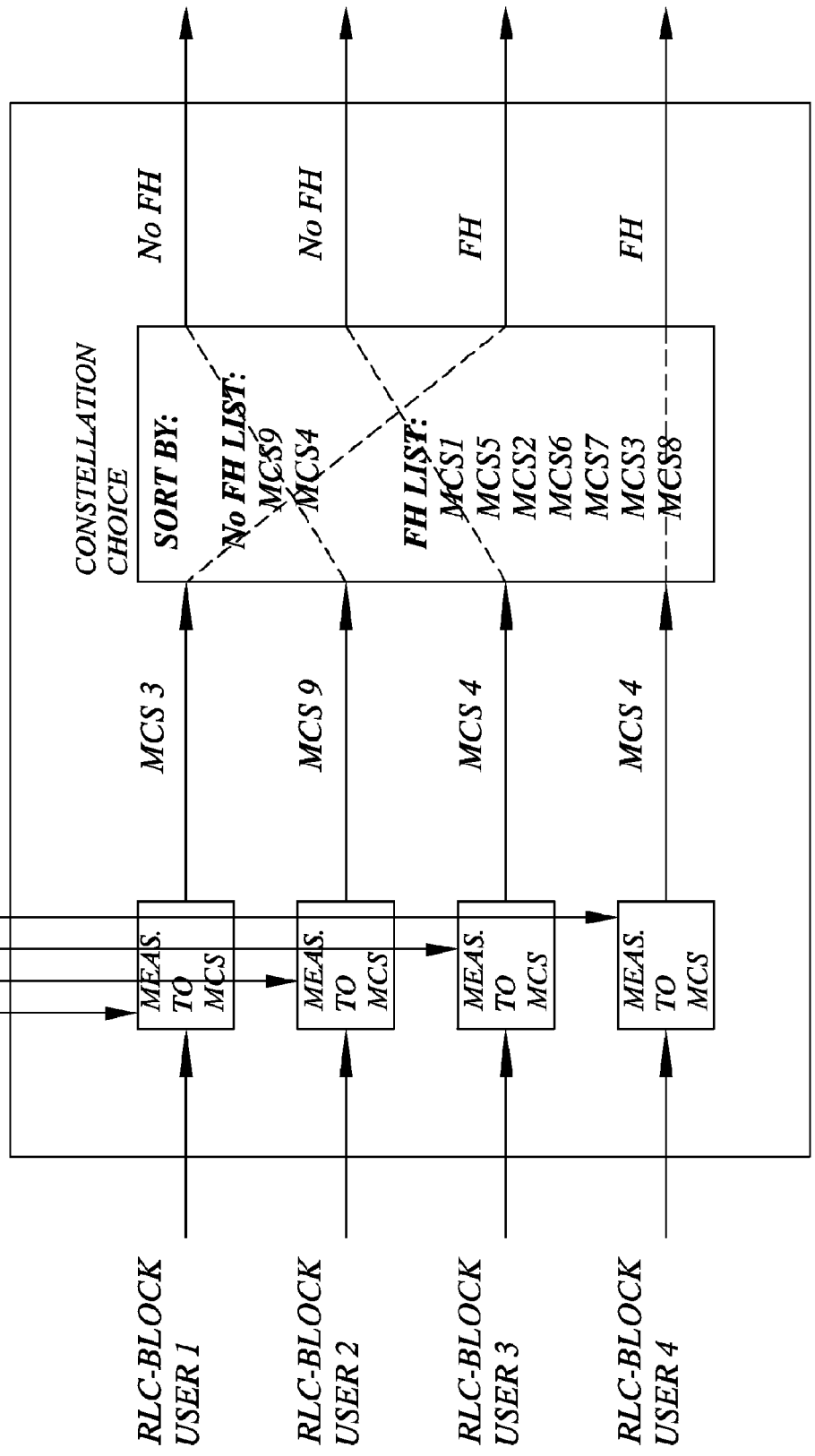
FIG. 6 is an illustration of an embodiment of the invention.

A specific embodiment will be described below with reference to FIG. 6. In this case four carriers are used by a specific user. Out of these four frequencies, two are hopping frequencies and two are non-hopping frequencies. The MCS-1 block has a robust coding that would benefit from diversity, and each burst is sent on a separated carrier. The MCS-9 block has coding rate 1 (virtually uncoded) and will therefore not benefit from diversity. The two RLC blocks in the MCS-9 radio block are therefore sent in parallel over the two non-hopping channels, thereby achieving higher performance due to lower diversity.

Further, the single RLC block in the MCS-1 radio block is sent one burst per frequency, thus providing more diversity over the block.

In the present embodiment, measurements are performed on the complete channel (all available frequencies in the multi carrier allocation) and each user is scheduled according to a priority list. Here MCS-9 and MCS-4 are preferably put on non-hopping channels, while the other MCS:s prefer hopping channels.

Since all the RLC blocks are scheduled "simultaneously" or jointly, there is a limit to how to allocate the bursts. Therefore, if e.g. no more non-hopping channel is available for MCS-4 a hopping channel has to be used and vice versa. In some sense the set of potential burst constellations is limited for each set of RLC blocks that need to be scheduled for transmission.

The present invention is described in the context of a multi-carrier case. However, the invention is equally applicable to the single-carrier case. In that case, the scheduling of bursts has to be performed by means of channel re-allocation instead of scheduling.

Figure 7:
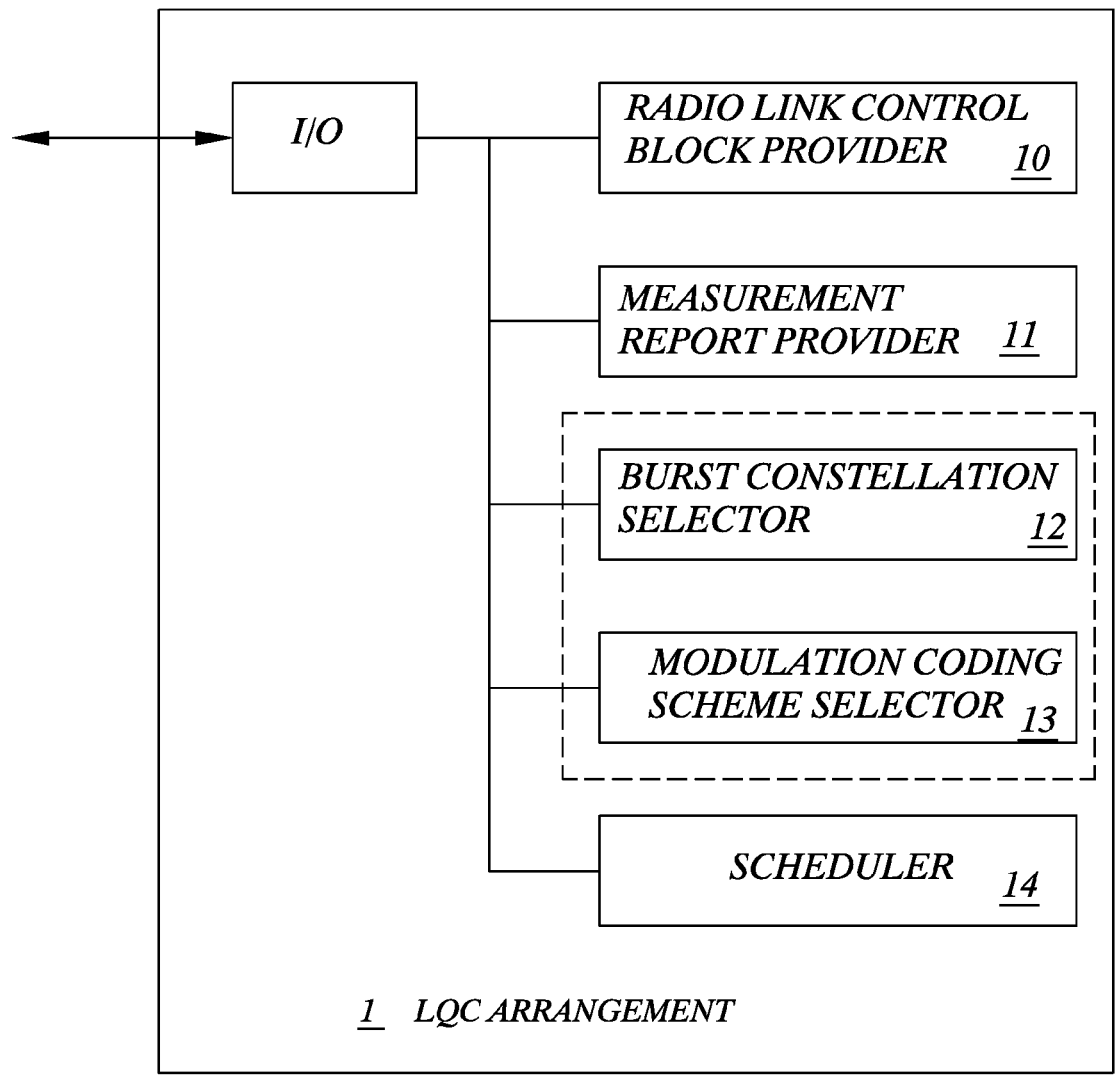
FIG. 7 is a schematic block diagram of an arrangement according to the invention.

In order to enable the above described embodiments of the method of the invention, a system or an arrangement will be described below, with reference to FIG. 7.

The arrangement 1 denoted an LQC unit or box includes a general input/output unit I/O for handling input and output signals for the arrangement 1. Additionally the arrangement includes a unit 10 for providing RLC blocks that are to be transmitted to a respective of a plurality of mobile users. Further, a unit 11 for providing the measurement reports for each of the mobile users is included in the arrangement 1. A unit 12 for performing the selection of burst constellations from all potential burst constellations, or optionally from a predetermined subset of potential burst constellations based on at least the received measurement reports and optionally on specific QoS requirements for each user, is further included. Similarly, a unit 13 for selecting a suitable modulation and coding scheme is provided. Optionally, the two units 12, 13 are arranged as a single unit. The MCS selecting unit 13 is configured for selecting a suitable MCS for each RLC block and user based on at least the measurement reports and selected burst constellation. Finally, the arrangement 1 includes a scheduling unit 14 for scheduling or re-allocating the bursts on various carriers or channels based on the selected burst constellations and MCS.

The arrangement can be located in a base station controller or in a base transceiver station, or in some other functional node in the system.

For the described case of downlink transmissions, the unit 11 for providing the measurement reports is configured for receiving quality measurements or the measurement reports concerning potential burst allocations from the respective mobile terminals 100, 200. Consequently, the mobile terminals need to be configured for performing the measurements and reporting them, preferably in the form of measurement reports, to the node i.e. base transceiver station.

To affect the number of necessary measurements and subsequent header search, the mobile terminals can be further adapted to perform measurements for all possible potential burst constellations or optionally for a subset of all potential burst constellations. The subset can be preset to provide an optimal variation of constellations and MCS for data blocks.

For the previously mentioned case of uplink transmissions from a mobile terminal to the base transceiver station, the mobile terminal is configured for receiving instructions on how to schedule data blocks on burst constellations for transmission to the base transceiver station. The instructions arise from measurements of link quality performed for a plurality of potential burst constellations at the base transceiver station.

Figure 8:
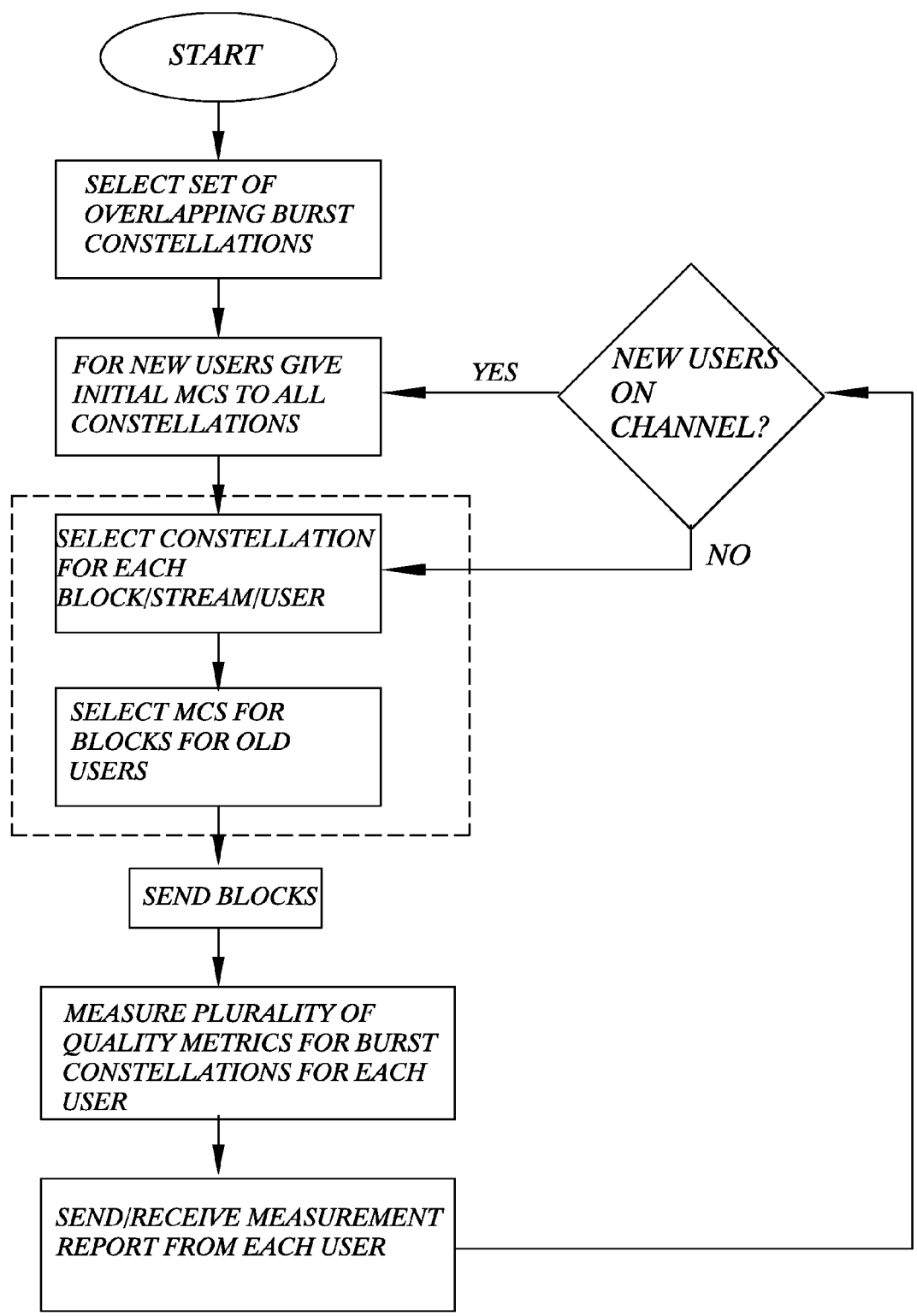
FIG. 8 is a schematic flow diagram of an embodiment of a method of the invention.

A specific embodiment of a method according to the invention will be described below with reference to FIG. 8.

Initially a set of burst constellations, preferably overlapping, are selected for a base transceiver station. All mobile terminals or users (and eventually all new users) are allocated an initial modulation and coding scheme for every burst constellation. Subsequently, a burst constellation with initial MCS is jointly selected for each data block provided for transmission at the base transceiver station. The data blocks are scheduled according to the jointly selected burst constellations and MCS and transmitted to the respective mobile terminals.

Each receiving mobile terminal measures a plurality of quality metrics for a set of burst constellations and reports those in the form of at least two measurement reports to the base transceiver station.

For the next "iteration" new users are as previously described given an initial MCS and an initial burst constellation. Data blocks for transmission to old users are given a respective burst constellation and MCS based on the provided measurement reports and QoS profiles.

Advantages of the present invention comprise:
Efficient choice of modulation and coding schemes and burst constellation
Increased throughput and lower delays
Flexible choice of TTI-length, which can be combined with the QoS profile and be used as a parameter when the constellation and MCS is chosen It will be understood by those skilled in the art that various modifications and changes may be made to the present invention without departure from the scope thereof, which is defined by the appended claims.

REFERENCES

[1] T. Jönsson et al., High capacity strategies for GSM/EDGE-Frequency hopping and EDGE packet data. In *Proc. IEEE Nordic Radio Symposium*, 2004.
[2] T. Jönsson et al., High Capacity Strategies for GSM/EDGE-Impacts on Data Traffic Performance. In *Proc. IEEE VTC* 2004 Fall.

The invention claimed is:

1. A method of link quality control for communication links between a plurality of mobile terminals and a node in a radio communication system, said method comprising the steps of:
providing at least one data block for transmission between said node and at least one of said mobile terminals,
providing at least two measurement reports comprising measurements of the quality for a plurality of potential burst constellations on which to transmit said at least one data block, wherein said plurality of potential burst constellations comprises a sub-set of all potential burst constellations;
jointly selecting a respective burst constellation and a respective Modulation and Coding Scheme (MCS) for each said at least one data block based at least on said measurement reports; and
scheduling bursts for transmission on at least one available channel based at least on said jointly selected MCS and burst constellation.

2. The method according to claim 1, wherein said node is a base transceiver station.

3. The method according to claim 2, wherein said at least one data block is provided at the base transceiver station for downlink transmission to at least one of said mobile terminals.

4. The method according to claim 3, wherein said at least two measurement reports are provided by each of said at least one mobile terminal.

5. The method according to claim 2, wherein said at least one data block is provided at said at least one mobile terminal for uplink transmission to said base transceiver station.

6. The method according to claim 5, wherein said at least two measurement reports are provided by said base transceiver station.

7. The method according to claim 1, wherein burst constellations in said plurality of potential burst constellations are allocated in time, and frequency.

8. The method according to claim 1, wherein burst constellations in said plurality of potential burst constellations are selected based on quality of service requirements for said at least one mobile terminal.

9. The method according to claim 1, wherein said bursts are scheduled sequentially on the same carrier.

10. The method according to claim 1, wherein said bursts are scheduled simultaneously and in parallel on a number of carriers.

11. The method according to claim 1, wherein said bursts are scheduled in parallel pairs and sequentially on two carriers.

12. The method according to claim 7, wherein said burst constellations in said plurality of potential burst constellations are additionally allocated between different time slots.

13. The method according to claim 1, wherein available channels are divided into at least two groups of channels.

14. The method according to claim 13 wherein said at least two groups comprise frequency-hopping and non-frequency-hopping channels respectively.

15. The method according to claim 14, wherein the data blocks are scheduled for transmission on hopping or non-hopping channels based on the selected MCS.

16. The method according to claim 15, wherein the data blocks are prioritized for scheduling for transmission on hopping or non-hopping channels based on the selected MCS.

17. The method according to claim 1, wherein said data block is a radio link control block.

18. A system for link quality control of communication links between a plurality of mobile terminals and a node in a radio communication system, said system is configured to perform the following:
provide at least one data block for transmission between said node and at least one of said plurality of mobile terminals;
further provide at least two measurement reports comprising measurements of the quality for potential burst constellations on which to schedule said at least one data block for transmission, wherein said two measurement reports comprise measurements of the quality for a sub-set of all potential burst constellations on which to schedule said at least one data block for transmission;
jointly select a respective burst constellation and a respective Modulation and Coding Scheme (MCS) for said at least one data block based at least on said measurement reports; and
schedule bursts for transmission on at least one available channel based at least on said jointly selected MCS and burst constellation.

19. An arrangement for link quality control of communication links between a plurality of mobile terminals and a node in a radio communication system, said arrangement is adapted to perform the following:
provide at least one data block for transmission between said node and at least one of said plurality of mobile terminals;
further provide at least two measurement reports comprising measurements of the quality for potential burst constellations on which to schedule said at least one data block for transmission, wherein said two measurement reports comprise measurements of the quality for a sub-set of all potential burst constellations on which to schedule said at least one data block for transmission;
jointly select a respective burst constellation and a respective Modulation and Coding Scheme (MCS) for said at least one data block based at least on said measurement reports; and
schedule bursts for transmission on at least one available channel based at least on said jointly selected MCS and burst constellation.

20. A base transceiver station in a radio communication system, comprising an arrangement according to claim 19.

21. The base transceiver station according to claim 20, wherein said arrangement is adapted to receive said at least two measurement reports from each of said plurality of mobile terminals, and further adapted to schedule data blocks for downlink transmission from said base transceiver station to said plurality of mobile terminals.

22. The base transceiver station according to claim 20, wherein said arrangement is adapted to perform said quality measurements for said subset of potential burst constellations and provide said measurement reports, and wherein said arrangement is further adapted to instruct each of said plurality of mobile terminals to schedule data blocks for uplink transmission from said mobile terminal to said base transceiver station according to the selected burst constellation and MCS.

* * * * *